United States Patent
Lopez et al.

(10) Patent No.: US 9,847,895 B2
(45) Date of Patent: Dec. 19, 2017

(54) MODULATION INDEX SHIFT SIGNALING

(71) Applicant: Telefonaktiebolaget L M Ericsson (publ), Stockholm (SE)

(72) Inventors: Miguel Lopez, Solna (SE); Bo Hagerman, Tyresö (SE); Yi-Pin Eric Wang, Fremont, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 190 days.

(21) Appl. No.: 14/430,573

(22) PCT Filed: Feb. 4, 2015

(86) PCT No.: PCT/SE2015/050121
§ 371 (c)(1),
(2) Date: Mar. 24, 2015

(87) PCT Pub. No.: WO2016/126175
PCT Pub. Date: Aug. 11, 2016

(65) Prior Publication Data
US 2016/0373279 A1  Dec. 22, 2016

(51) Int. Cl.
*H04B 7/00* (2006.01)
*H04L 27/20* (2006.01)
*H04L 5/00* (2006.01)
*H04L 7/04* (2006.01)
*H04L 27/22* (2006.01)
*H04W 84/12* (2009.01)
*H04W 4/00* (2009.01)

(52) U.S. Cl.
CPC ........ *H04L 27/2003* (2013.01); *H04L 5/0053* (2013.01); *H04L 7/04* (2013.01); *H04L 27/201* (2013.01); *H04L 27/2017* (2013.01); *H04L 27/22* (2013.01); *H04W 4/008* (2013.01); *H04W 84/12* (2013.01)

(58) Field of Classification Search
CPC ..... H04L 27/2008; H04L 5/0053; H04L 7/04; H04L 27/201; H04L 27/2017; H04L 27/22
See application file for complete search history.

(56) References Cited

U.S. PATENT DOCUMENTS

| | | | | |
|---|---|---|---|---|
| 5,832,022 A | * | 11/1998 | Scott | H04L 27/201 332/106 |
| 2005/0207474 A1 | * | 9/2005 | Voglewede | H04B 1/713 375/132 |
| 2010/0150096 A1 | * | 6/2010 | Choi | H04L 1/0025 370/329 |

OTHER PUBLICATIONS

Hwang, H-K., et al., "Multi-H Phase-Coded Modulations with Symmetric Modulation Indexes", IEEE Journal on Selected Areas in Communications, Dec. 7, 1989, pp. 1450-1461, No. 9, New York, US.

(Continued)

*Primary Examiner* — Mohammed Rachedine
(74) *Attorney, Agent, or Firm* — Coats & Bennett, PLLC

(57) ABSTRACT

A transmitting device (20) overlays control information onto information bit stream intended for a receiving device (40) by varying or shifting the modulation index in continuous phase modulation (CPM) waveform. The receiving device (40) detects the modulation index used at the transmitting device (20) to modulate the data burst. The receiving device (40) then determines the control information based on the detected modulation index.

36 Claims, 12 Drawing Sheets

(56) References Cited

OTHER PUBLICATIONS

Fonseka, J., et al, "Combined correlatively encoded multi-h CPFSK signalling", Global Telecommunications Conference, Countdown to the New Millennium. Featuring a Mini-Theme on: Personal Communications Services, Dec. 2, 1991, pp. 23.7.1-23.7.5, (pp. 797-801 vol. 2 ), IEEE.

Cuthbert, J., et al, "Multi-h modulation Indexes Selection Using the PBIL Algorithm", IEEE AFRICON 4th, Sep. 24, 1996, pp. 1109-1114, vol. 2, IEEE.

* cited by examiner $t_0$

MODULATION INDEX SHIFT SIGNALING

TECHNICAL FIELD

The present disclosure relates generally to signaling control information in a wireless communication network and, more particularly, to techniques and apparatus for reducing signaling overhead by overlaying control information onto transmitted data.

BACKGROUND

BLUETOOTH® is a wireless communication technology for exchanging data over short distances. Bluetooth was originally conceived as an alternative to serial cables for connecting devices. Bluetooth Low Energy (BLE), which is marketed under the mark BLUETOOTH SMART®, is an extension of the Bluetooth Standard that provides considerably reduced power consumption and cost while maintaining a similar communication range. The BLE standard is incorporated into the Bluetooth Core Specification, ver. 4.0 (2010). The Bluetooth standard is maintained by the Bluetooth Special Interest Group (SIG).

Discussions are currently underway in the Bluetooth SIG for a new extension of the Bluetooth standard referred to as BLE Long Range or Bluetooth Smart Long Range. The current proposal for BLE Long Range supports two information bit rates, 125 kbps and 500 kbps. A third information rate of 250 kbs is also being considered.

In the BLE Long Range standard under consideration, data is transmitted from a transmitter to a receiver in units called data bursts. Each data burst includes a preamble that is used for time and/or frequency synchronization and a payload containing user data. The user data is transmitted at a variable data rate that varies from one data burst to another. The data rate for the user data is signaled to the receiver by inserting a rate indicator (RI) information element (IE) into the data burst. In the current proposal, the rate indicator IE requires four octets, which is a relatively large overhead for the amount of user data that is transmitted in one data burst. Therefore, more efficient ways of signaling the rate information are desired.

SUMMARY

The present invention relates generally to the signaling of control information over low power, short range wireless communication links. In exemplary embodiments, the control information is overlaid onto a portion of the data burst, or the entire data burst, by varying or shifting the modulation index in continuous phase modulation (CPM) waveforms. This technique is referred to herein as modulation index shift signaling. The receiver detects the modulation index used at the transmitter to modulate the data burst. The receiver then determines the control information based on the detected modulation index.

As one example, a Bluetooth transmitter uses Gaussian frequency shift keying (GFSK) to modulate a data burst. The transmitter can overlay signaling information onto the data burst by varying the modulation index used for GFSK modulation. For example, the modulation index used for modulating the synchronization word or preamble in a data burst may be varied to signal the control information. The receiver detects the modulation index using the synchronization word or the preamble. In one embodiment, the control information overlaid on the data burst is the information bit rate for the user data.

The techniques described herein for varying modulation to signal control information to implicitly signal the controlled information, reduces the number of bits needed to send control information from a transmitter to a receiver. The reduction in the number of data bits used for sending control information improves system efficiency since fewer bits are needed to send the same amount of information.

Exemplary embodiments of the disclosure comprise methods of sending control information from a transmitting device to a receiving device. In one exemplary embodiment of the method, the transmitting device generates a modulated signal that signals the control information to the receiving device. The modulated signal is generated by mapping the control information to a selected modulation index set and modulating an information bit stream for the receiving device with a continuous phase modulator using the selected modulation index set. The transmitting device transmits the modulated signal to the receiving device.

In some embodiments of the method, the modulation index set comprises a single index value applied to selected information bits in said information bit stream.

In some embodiments, the modulation index set comprises a sequence of index values applied to respective ones of selected information bits in said information bit stream.

In some embodiments of the method of the method, modulating an information bit stream for the receiving device comprises modulating a known bit sequence in the information bit stream that is known to the receiving device using the selected modulation index set.

In some embodiments of the method, modulating the known bit sequence comprises modulating a predefined synchronization sequence in the information bit stream using the selected modulation index set.

In some embodiments of the method, each modulation index in the modulation index set is set to one of a first value or a second value.

In some embodiments of the method, modulating an information bit stream for the receiving device comprises inverting the sign of each selected information bit in the information bit stream when the value of a corresponding modulation index in the modulation index set is the second value to generate a modified information bit stream, and modulating the modified information bit stream in the continuous phase modulator using a fixed modulation index corresponding to the first value.

In some embodiments of the method, modulating an information bit stream with a continuous phase modulator using the selected modulation index set comprises modulating the information bit stream in the continuous phase modulator using a fixed modulation index corresponding to the first value to generate an initial signal, and conjugating selected ones of the modulation symbols in the initial signal when a corresponding modulation index in the modulation index set is the second value to generate the modulated signal.

In some embodiments of the method, the information bit stream includes user data bits and wherein the control information comprises data rate information for the user data bits in the information bit stream.

Other embodiments of the disclosure comprise a transmitting device comprising configured to signal control information to a receiving device. In one exemplary embodiment, the transmitting device comprises a processing circuit and a transmitter. The processing circuit is configured to to generate a modulated signal that signals control information to a receiving device by mapping control information for the receiving device to a selected modulation index set and modulating an information bit stream with a continuous phase modulator using the selected modulation index set. The transmitter is configured to transmit the modulated information bit steam to a receiving device.

In some embodiments of the transmitting device, the modulation index set comprises a single index value applied to selected information bits in said information bit stream.

In some embodiments of the transmitting device, the modulation index set comprises a sequence of index values applied to respective ones of selected information bits in said information bit stream.

In some embodiments of the transmitting device, the processing circuit is configured to modulate a known bit sequence in the information bit stream that is known to the receiving device using the selected modulation index set.

In some embodiments of the transmitting device, the processing circuit is configured to modulate a predefined synchronization sequence in the information bit stream using the selected modulation index set.

In some embodiments of the transmitting device, each modulation index in the modulation index set used by the processing circuit is set to one of a first value or a second value.

In some embodiments of the transmitting device, the processing circuit is configured to invert the sign of each selected information bits in the information bit stream when the value of a corresponding modulation index in the modulation index set is the second value to generate a modified information bit stream, and to modulate the modified information bit stream using a fixed modulation index corresponding to the first value.

In some embodiments of the transmitting device, the processing circuit is configured to modulate the information bit stream in a continuous phase modulator using a fixed modulation index corresponding to the first value to generate an initial signal, and to conjugate selected ones of the modulation symbols in the initial signal when a corresponding modulation index in the modulation index set is the second value to generate the modulated signal.

In some embodiments of the transmitting device, the information bit stream includes user data bits and the control information comprises the information bit rate for the user data bits in the information bit stream.

Exemplary embodiments of the disclosure comprise methods of receiving control information from a transmitting device by a receiving device. In one exemplary embodiment of the method, the receiving device receives, from the transmitting device, a modulated signal generated by modulating an information bit stream in a continuous phase modulator using a predefined modulation index set. The receiving device processes the modulated signal to detect the modulation index set used by the transmitting device to generate the modulated signal, and determines the control information by mapping the modulation index set to a corresponding one of a predefined set of control information.

In some embodiments of the method, the modulation index set comprises a single index value applied to selected information bits in said information bit stream.

In some embodiments of the method, the modulation index set comprises a sequence of index values applied to respective ones of selected information bits in said information bit stream.

In some embodiments of the method, processing the modulated signal to detect the modulation index set comprises processing a portion of the modulated signal containing a known bit sequence to detect the modulation index set.

In some embodiments of the method, processing a portion of the modulated signal containing a known bit sequence comprises processing a portion of the modulated signal containing the known bit sequence to jointly detect the modulation index set and time synchronization.

In some embodiments of the method, processing the modulated signal to detect the modulation index set comprises correlating the modulated signal with one or more known modulation symbol sequences.

In some embodiments of the method, correlating the modulated signal with one or more known modulation sequences comprises correlating a first portion of the modulated signal with a first predetermined index sequence and correlating a second portion of the modulated signal with a second predetermined index sequence.

In some embodiments of the method, the information bit stream includes user data bits. The receiving device demodulates the modulated signal to obtain coded data bits, and then decodes the coded data bits based on the control information to obtain the user data bits.

Some embodiments of the disclosure comprise a receiving device configured to receive control information from a transmitting device. One exemplary receiving device comprises a receiver and a processing circuit. The receiver is configured to receive, from a transmitting device, a modulated signal sequence generated by modulating an information bit stream in a continuous phase modulator using a predefined modulation index set. The processing circuit is configured to detect the modulation index set used by the transmitting device to generate the modulated signal, and to determine the control information by mapping the modulation index set to a corresponding one of a predefined set of control information.

In some embodiments of the receiving device, the modulation index set comprises a single index value applied to selected information bits in said information bit stream.

In some embodiments of the receiving device, the modulation index set comprises a sequence of index values applied to respective ones of selected information bits in said information bit stream.

In some embodiments of the receiving device, the processing circuit is configured to detect the modulation index set by processing a portion of the modulated signal containing a known bit sequence that is known to the receiving device.

In some embodiments of the receiving device, the processing circuit is further configured to jointly detect the modulation index set and the time synchronization using the known bit sequence.

In some embodiments of the receiving device, the processing circuit is configured to correlate the modulated signal with one or more known modulation symbol sequences.

In some embodiments of the receiving device, the processing circuit is configured to correlate a first portion of the modulated signal with a first modulation symbol sequence and a second portion of the modulated signal with a second modulation symbol sequence.

In some embodiments of the receiving device, the information bit stream includes user data bits and the processing circuit is further configured to demodulate the modulated signal to obtain coded data bits, and to decode the coded data bits based on the control information to obtain the user data bits.

Other embodiments of the disclosure comprises a computer program comprising instructions which, when executed by at least one processor of a transmitting device, causes the transmitting device to carry out the method of any of claims 1-16.

Other embodiments of the disclosure comprises a carrier containing the computer program of the preceding paragraph, wherein the carrier is one of an electronic signal, optical signal, radio signal, or computer readable storage medium.

Other embodiments of the disclosure comprises a computer program comprising instructions which, when executed by at least one processor of a receiving device, causes the receiving device to carry out the method of any of claims 19-26.

Other embodiments of the disclosure comprises a carrier containing the computer program of the preceding paragraph, wherein the carrier is one of an electronic signal, optical signal, radio signal, or computer readable storage medium.

DETAILED DESCRIPTION

Figure 1:
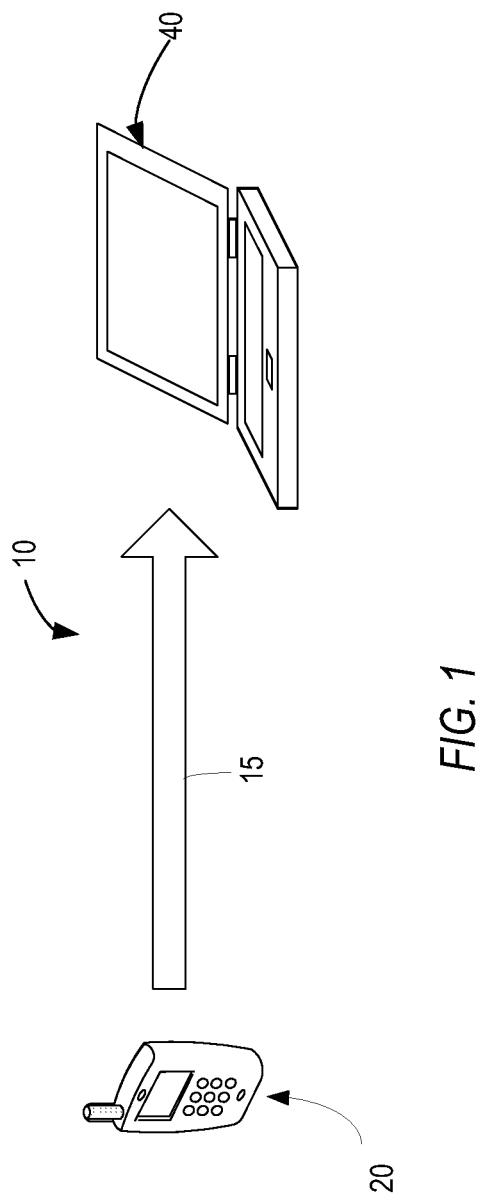
FIG. 1 illustrates a personal area network comprising two communication devices.

Referring now to the drawings, FIG. 1 illustrates a personal area network (PAN) 10 comprising two communication devices, a transmitting device 20 and a receiving device 40, that exchange information over a wireless communication link 15. In the exemplary PAN 10, information is exchanged directly between the two communication devices 20, 40 using a short range wireless communication technology, such as Bluetooth Low Energy (BLE) or BLE Long Range. While this disclosure describes certain techniques in the context of a BLE or BLE Long Range network, those skilled in the art will appreciate that the techniques are applicable to other wireless communication technologies.

Bluetooth Low Energy (BLE) and BLE Long Range employ Gaussion Frequency Shift Keying (GFSK) modulation, which is a type of continuous phase modulation (CPM). The continuous-time complex-valued baseband waveform x(t) generated by the modulator of the transmitting device 20 can be expressed in the form $$x(t)=\exp(j\pi h \cdot \phi(t)), \quad \text{Eq. (1)}$$

where t is time, h is the so-called modulation index, and $\phi(t)$ is the phase waveform, which depends upon the transmitted bits. In BLE, the modulation index has the nominal value $$h = \frac{1}{2},$$

although deviations up to +0.05 around the nominal value are allowed in order to accommodate for hardware imperfections.

Equation 1 describes a CPM signal with a single modulation index, often called single-h CPM modulation in order to stress the fact that only one modulation index is used. Single-h modulation can be generalized to multi-h CPM in which the baseband waveform is generated using several modulation indices. To illustrate multi-h modulation, assume that $b_k$ is the k-th transmitted bit. A sequence of modulation indices $\vec{h}=(h_k)$ is also selected. The continuous time baseband signal x(t) is given by $$x(t)=\exp(j\pi \cdot (\Sigma_k h_k \cdot (1-2b_k) \cdot p(t-kT_s)+\theta)), \quad \text{Eq. (2)}$$

where p is a so-called phase pulse, $T_s$ is the bit period, and $\theta$ is an arbitrary initial phase.

The transmitting device 20 and receiving device 40 exchange information in units referred to herein as data bursts. The data burst is sent from the transmitting device 20 to the receiving device 40. Those skilled in the art will appreciate that a communication device may function as both a transmitting device 20 and a receiving device 40 depending on the direction of the information exchange.

Figure 2:
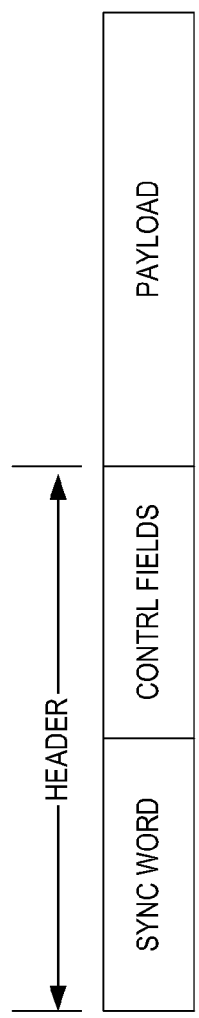
FIG. 2 illustrates a generalized data format for a data burst.

FIG. 2 illustrates a generalized data format for a data burst. The data burst comprises a synchronization word (sync word for short) and a payload that contains user data. The sync word comprises a known bit sequence that is used by the receiving device 40 to facilitate time synchronization and, in some instances, frequency synchronization. The sync word can be detected by the receiving device 40 to determine the proper time reference. The payload contains user data which may be coded with an forward error correcting (FEC) code. Such a generic burst format is used in many technologies, e.g., BLE, BLE Long Range (BLR) and Wireless Local Area Network (WLAN) technologies according to the Institute of Electrical and Electronics Engineers (IEEE) 802.11 family of standards.

Figure 3:
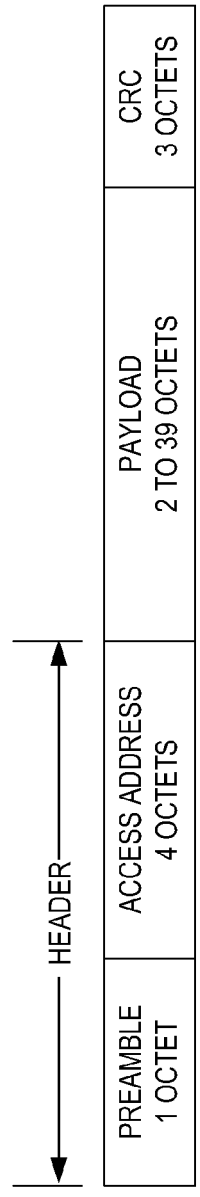
FIG. 3 illustrates an exemplary data format for a data burst in BLE.

FIG. 3 illustrates an exemplary data format for a data burst used in BLE. As seen in FIG. 3, the data burst for BLE includes a preamble, an access address field, a payload field, and a cyclic redundancy check (CRC) field. The preamble comprises one octet and contains a known bit sequence used for time synchronization. The access address field comprises 4 octets and contains the physical link access code. The device 40 may use the access address for time synchronization. The payload field contains user data and may comprise from 2-39 octets. The CRC filed comprises 3 octets and contains a CRC code generated from the bits in the payload field.

Figure 4:
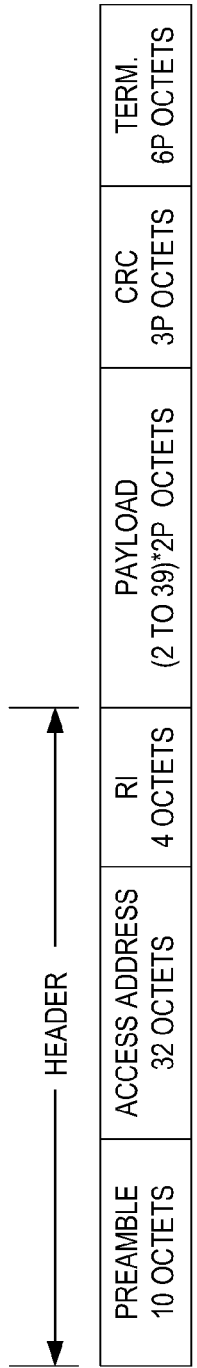
FIG. 4 illustrates an exemplary data format for a data burst in BLE Long Range.

FIG. 4 illustrates another data format for a data burst in BLE Long Range. This data format comprises a preamble, an access address field, a rate indication (RI) field, a payload field, a CRC field, and a termination bit field. The preamble comprises 10 octets and contains a known bit sequence used for time synchronization as previously described. The access address field comprises 32 octets and contains the physical link access code. The RI field comprises 4 octets and indicates the information bi rate for the payload field. In one exemplary embodiment, the information bit rate may be either 500 kbps or 125 kbps. The payload field contains user data that may be been encoded with a FEC code. The payload may contain (2 to 39)*2P octets, where P represents the spreading factor. The CRC field comprises 6P octets and contains a CRC code that is generated on the payload field. The termination bit field comprises 6P octets and contains a sequence of 0's to force the state of the decoder at the receiving device 40 to the all zero state. It may be noted that in current BLE Long Range proposal, the rate indication (RI) is signaled in a physical layer header as shown in FIG. 4. This indicator occupies 4 octets, which is a hefty overhead. More efficient ways of signaling the RI are desired.

In exemplary embodiments of the disclosure, control information is overlaid on a certain portion of a data burst or the entire data burst by shifting the modulation index in the CPM waveform. Thus, the modulation index used to generate the waveform implicitly signals the control information. The receiver detects the modulation index in the received CPM waveform and determines the control information based on the detected modulation index. Such a signaling method can be referred to as modulation index shift signaling.

According to one example of the disclosure, the overlaid control information is the information bit rate for the payload field. For example, the data burst is modulated using GFSK with a modulation index h=½ to signal that the information bit rate is 125 kbps, whereas the data burst is modulated with GFSK using modulation index h=−½ to signal that the information bit rate is 500 kbps. In some embodiments, the portion of the data burst that will be used to carry the overlaid control information is the "sync word" portion as illustrated in FIG. 2, or the "Preamble" portion as illustrated in FIGS. 3 and 4. The receiving device 40 determines the information bit rate by detecting the modulation index of the CPM waveform for the sync word portion or preamble portion of the received signal. In the below description, the terms "sync word," "synchronization word," and "Preamble" are used interchangeably. In some cases, the preamble may include a synchronization word. Implicit signaling of the information bit rate replaces the RI field in the data burst for BLE Long Range so that the bandwidth is more efficiently used and the overhead in the physical layer header is reduced. Those skilled in the art will appreciate that the modulation index shift signaling as herein described is not limited to signaling rate information, but could be used to signal any type of control information.

Transmitting Device Implementation

Single-h CPM

Suppose, for example, that a transmitting device 20 is sending a bit sequence $b_k$ to a receiving device 40, and that single-h CPM modulation is used. Assume also that, in addition to the bit sequence, the transmitting device 20 needs to signal control information or other information to the receiving device 40. The control information is first mapped to an integer. For example a first control message is mapped to the number 1, a second control message is mapped to the number 2, and so on. In general, assume that there are N possible control messages and that the transmitting device 20 wishes to transmit one of them to the receiving device 40, p.g., n, with $1 \leq n \leq N$. According to one exemplary embodiment, the following steps are performed:

Choose N different modulation indices $\{h_1, h_2, \ldots, h_N\}$. This set of possible modulation indices is known at both the transmitting device 20 and the receiving device 40. The modulation indices are not required to be positive.

Generate a one to one mapping of modulation indices $\{h_1, h_2, \ldots, h_N\}$ to control messages.

If the transmitting device 20 wishes to send the control message number n to the receiving device 40, then it modulates the bit sequence $b_k$ using single-h CPM modulation with modulation index $h_n$.

An especially simple case occurs when there are only two messages. In this case the set possible modulation indices may be chosen to be $\{h, -h\}$, where h is a fixed value.

Example 1

Suppose a BLE Long Range transmitting device 20 wishes to send a bit sequence $b_k$ to a BLE Long Range receiving device 40. The burst is formatted according to FIG. 4, except that the RI field is removed. the possible information bit rates are 125 kbps and 500 kbps. In order to signal the information bit rate, the data burst is modulated using GFSK modulation with a modulation index $$h = \frac{1}{2}$$

if the information bit rate equals 125 kbps and with a modulation index $$h = -\frac{1}{2}$$

if the information bit rate equals 500 kbps.

Multi-h CPM

The signaling techniques herein described may also be adapted for use with multi-h modulation. As before, assume that a transmitting device 20 is sending a bit sequence $b_k$ to a receiving device 40, and that it also needs to send one of N possible control messages to the receiving device 40. The control information is first mapped to an integer. For example a first control message is mapped to the number 1, a second control message is mapped to the number 2, and so on. In general assume that there are N possible control messages and that the transmitting device 20 wishes to transmit one of them to the receiving device 40, say n, with $1 \leq n \leq N$. According to one exemplary embodiment, the following are the steps are performed:

Choose N different sequences of modulation index sequences $\{\vec{h}_1, \vec{h}_2, \ldots, \vec{h}_N\}$. The arrow indicates that each member of the set is a sequence. For example $\vec{h}_n = (h_1{}'', h_2{}'', h_3{}'', \ldots)$. This set of possible modulation index sequences is known at both the transmitting device 20 and the receiving device 40. The modulation indices in the modulation index sequences are not required to be positive.

Generate a one to one mapping of modulation index sequences $\{\vec{h}_1, \vec{h}_2, \ldots, \vec{h}_N\}$ to control messages.

If the transmitting device 20 wishes to send the control message number n to the receiving device 40, the transmitting device 20 modulates the bit sequence $b_k$ using multi-h CPM modulation with modulation index sequence $\vec{h}_n = (h_1{}'', h_2{}'', h_3{}'', \ldots)$.

Example 2

Suppose a BLE Long Range transmitting device 20 wishes to send a bit sequence $b_k$ to a Bluetooth receiving device 40. The data burst is formatted according to FIG. 4, except that the RI field is removed. The burst consists of 80 preamble bits, followed by 256 address bits, followed by data bits, CRC bits, and termination bits. Suppose also that there are 3 possible information bit rates: low (e.g., 125 kbps), medium (e.g., 250 kbps) and high (e.g., 500 kbps), but the receiving device 40 does not know the information bit rate. Three modulation index sequences could be defined as follows.

$$h_k^1 = \frac{1}{2} \text{ for all } k, \qquad \text{Eq. (3)}$$

$$h_k^2 = -\frac{1}{2} \text{ for all } k \qquad \text{Eq. (4)}$$

$$h_k^3 = \begin{cases} -\frac{1}{2} & \text{if } k \leq 40 \\ \frac{1}{2} & \text{if } k > 40 \end{cases} \qquad \text{Eq. (5)}$$

The transmitting device 20 inputs the bit sequence b(k) to a multi-h modulator with a modulation index sequence $\vec{h}_1 = (h_1{}^1, h_2{}^1, h_3{}^1, \ldots)$ if the information bit rate is low (e.g., 125 kbps). If the information bit rate is medium (e.g., 250 kbps), the transmitting device 20 inputs the bit sequence b(k) to the multi-h modulator with a modulation index sequence of $\vec{h}_2 = (h_1{}^2, h_2{}^2, h_3{}^2, \ldots)$. If the information bit rate is high (e.g., 500 kbps), the transmitting device 20 inputs the bit sequence b(k) to the multi-h modulator with a modulation index sequence of $\vec{h}_3 = (h_1{}^3, h_2{}^3, h_3{}^3, \ldots)$. Many other choices of the modulation index sequences are possible. Because BLE uses GFSK modulation with $$h = \frac{1}{2},$$

it is convenient to ensure that all the modulation indices $h_k{}''$ take only the values ½ or -½ in order to obtain some degree of backward compatibility with existing hardware or software.

Figure 5:
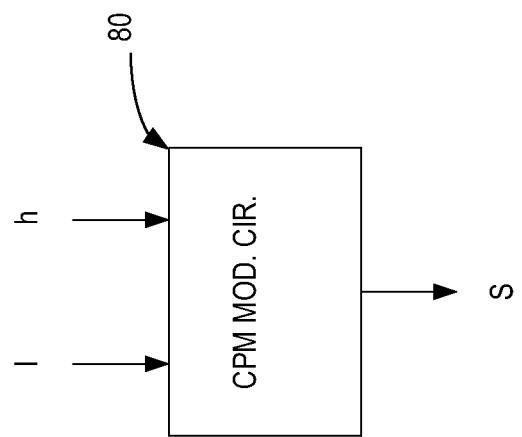
FIG. 5 illustrates a continuous phase modulator configured to implement modulation index shift signaling.

FIG. 5 illustrates a generalized CPM modulator 80 indicated generally by the numeral 80 for implementing the signaling techniques as herein described. The CPM modulator 80 may for example comprise a multi-h GFSK modulator. Those skilled in the art will appreciate that the multi-h GFSK modulator may perform single-h modulation by holding the modulation index h to a fixed value. For single-h modulation, the information bit stream I is input to the multi-h GFSK modulator 80 along with the modulation index h. In this case, the same modulation index h is applied during modulation to each information bit in the information bit sequence I. As previously described, h may conveniently take the value ½ or -½.

For multi-h modulation, the information bit stream I is input to the multi-h GFSK modulator 80 along with an modulation index sequence $\vec{h}_n$. In this case, the modulation indices $h_k{}''$ in the modulation index are applied to respective information bits in the information bit sequence during modulation. While many modulation index sequences are possible, it is convenient to constrain the value of the modulation indices in each modulation index sequence to either ½ or -½.

The techniques described herein can be easily implemented by reusing existing hardware and/or software. For example, it is very easy to generate a CPM waveform with modulation index h by re-using an existing software or hardware implementation of a CPM modulator with modulation index h. This is easily seen from Equation 1, since $\exp(-j\pi h \cdot \phi(t)) = \text{conj}(\exp(j\pi h \cdot \phi(t)))$, where conj( ) denotes complex conjugation. Hence, existing implementations of GFSK modulators can be easily modified to implement the techniques herein described by adding a complex conjugation at the output of an existing modulator whenever a negative modulation index is desired.

Figure 6:
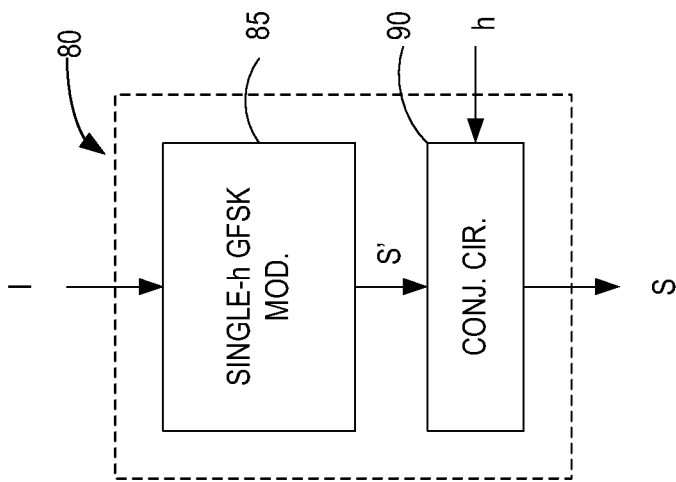
FIG. 6 illustrates an exemplary a continuous phase modulator implemented with a conventional single-h GFSK modulator.

FIG. 6 shows a functional block diagram of an implementation of a CPM modulator 80 comprising a single-h GFSK modulator 85 and a conjugating circuit 90. The information bit stream I is input to the single-h GFSK modulator 85, which uses a modulation index $$h = \frac{1}{2},$$

for example. The single-h GFSK modulator 85 modulates the information bit stream I and output a modulated signal S'. The modulated signal S' is input to the conjugating circuit 90. The modulation index $h_n$ or modulation index sequence $\vec{h}_n$ is input to the conjugating circuit 90. The conjugating circuit 90 comprises a circuit that is configured to conjugate selectively the modulation symbols in the modulated signal S' to generate the modulated signal S. More particularly, the conjugating circuit 90 conjugates each modulated symbol in the modulated signal S' where the corresponding modulation index $$h = -\frac{1}{2}.$$

The modulated signal S is transmitted to the receiving device 40. As previously noted, modulation index shift signaling may be applied to only a portion of the information bit stream, e.g., the sync word or preamble portions. The conjugating circuit 90 may be disabled for the remaining portion of the information bit stream.

Figure 7:
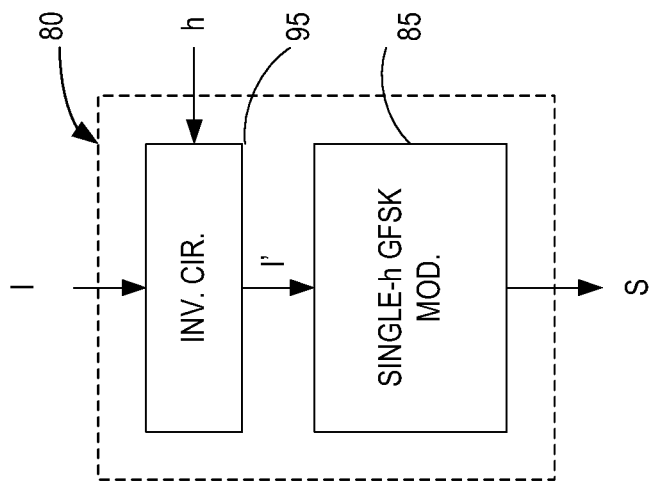
FIG. 7 illustrates another exemplary a continuous phase modulator implemented with a conventional single-h GFSK modulator.

FIG. 7 shows a functional block diagram of an implementation of a CPM modulator 80 comprising a single-h GFSK modulator 85 and an inverting circuit 95. This implementation is based on the observation that a GFSK modulator with modulation index $h=-\frac{1}{2}$ may also be obtained changing the polarity of the input bit sequence $b_k$ that is input to a GFSK modulator with modulation index $h=\frac{1}{2}$. That is, a 0 is mapped to a 1 and vice versa. In this embodiment, the information bit stream I and either the modulation index $h_n$ or modulation index sequence $\vec{h}_n$ is input to the inverting circuit 95. The inverting circuit 95 comprises a circuit that is configured to invert selectively the information bits in the information bit stream I to generate the modified information bit stream I'. More particularly, the inverting circuit 95 inverts each information bit in the information bit stream I where the corresponding modulation index $$h = -\frac{1}{2}.$$

The modified information bit stream I' is input to the single-h GFSK modulator 85, which uses a modulation index $$h = \frac{1}{2},$$

for example. The single-h GFSK modulator 85 modulates the modified information bit stream I' and outputs the modulated signal S, which is transmitted to the receiving device 40. As previously noted, modulation index shift signaling may be applied to only a portion of the information bit stream, e.g., the sync word or preamble portions. The inverting circuit 95 may be disabled for the remaining portion of the information bit stream I.

Figure 8:
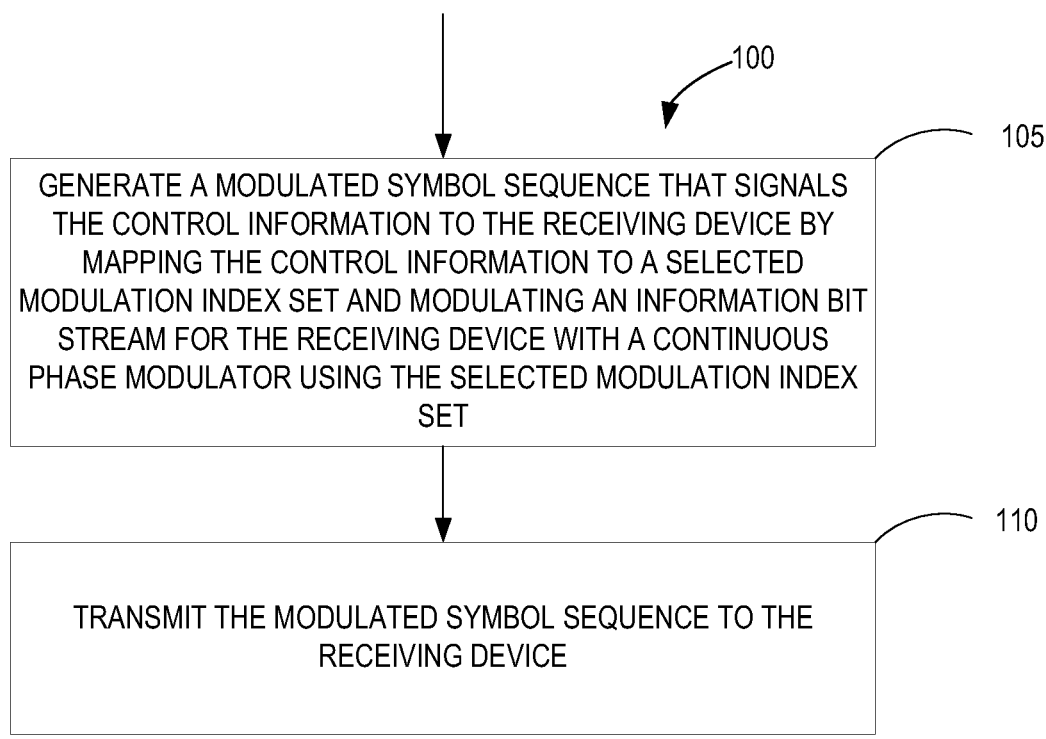
FIG. 8 illustrates an exemplary method of signaling control information from a transmitting device to a receiving device.

FIG. 8 illustrates an exemplary method 100 implemented by a transmitting device 20 for signaling control information I to a receiving device 40. The method 100 begins when an information bit stream I is ready for sending to the receiving device 40. The information bit stream I may be generated by the transmitting device 20, or may be received from another device. When the information bit stream is ready for sending, the transmitting device 20 generates a modulated signal S that signals the control information to the receiving device 40 (block 105). The modulated signal S is generated by mapping the control information to a selected modulation index set and modulating the information bit stream I with a continuous phase modulator using the selected modulation index set. The modulation index set may comprise a single modulation index $h_n$ mapped to a particular control message where single-h CPM is used, or may comprise a modulation index sequence $\vec{h}_n$ mapped to the particular control message where multi-h CPM is used. The modulated signal S is then transmitted to the receiving device 40 (block 110). As previously noted, modulating index shift signaling may be applied to the entire information bit stream I, or to a portion of the information bit stream I containing a known sequence of bits, such as the sync word or preamble.

Figures 9, 10:
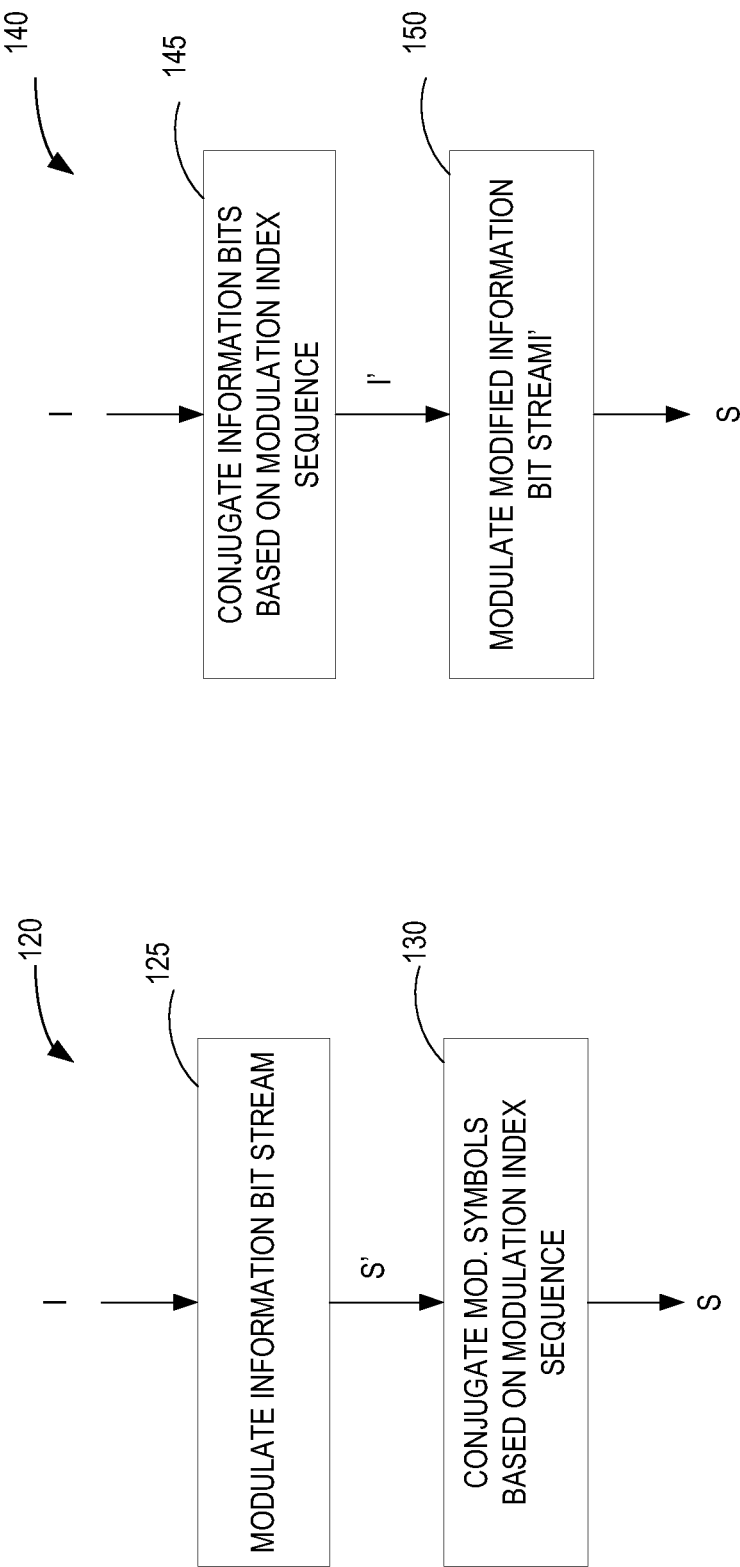
FIG. 9 illustrates a method of modulating an information bit stream in a transmitting device to signal control information to a receiving device.
FIG. 10 illustrates another method of modulating an information bit stream in a transmitting device to signal control information to a receiving device.

FIG. 9 illustrates an exemplary method 120 of modulation index shift signaling using a single-h GFSK modulator 85. The information bit stream I is first modulated conventionally using single-h GFSK modulation, typically with a modulation index $h=\frac{1}{2}$, to generate a modulated signal S' (block 125). The transmitting device 20 then conjugates selected ones of the modulated symbols in S' in accordance with a selected modulation index set that is mapped to the desired control message (block 130). For example, assume that the control information overlaid or superimposed on the preamble using modulation index shift signaling as herein described. In Example 1 above, the modulation symbols in S' corresponding to the preamble would not be changed when the modulation index $h=\frac{1}{2}$ and would be changed when the modulation index $h=-\frac{1}{2}$. In the first case, the modulated signal S=S'. In Example 2, the modulation symbols in S' corresponding to the preamble are left unchanged when the modulation index sequence $\vec{h}_1$ is selected and are changed when the modulation index set $\vec{h}_2$ is selected. When modulation index sequence $\vec{h}_3$ is selected, the first 40 symbols of the preamble are unchanged and the last 40 symbols are changed.

FIG. 10 illustrates another exemplary method 140 of modulation index shift signaling using a single-h GFSK modulator 85. Prior to modulation, the transmitting device 20 processes the information bit stream I to invert selected bits in the information bit stream in accordance with a selected modulation index set that is mapped to the desired control message (block 145). The information bit stream I' is then modulated conventionally using single-h GFSK modulation, typically with a modulation index $h=\frac{1}{2}$, to generate a modulated signal S (block 150). For example, assume that the control information is overlaid or superimposed on the preamble using modulation index shift signaling as herein described. In Example 1 above, the information bits in the preamble, referred to as the preamble bits, are unchanged when the modulation index $h=\frac{1}{2}$ is used and are inverted when the modulation index is $h=\frac{1}{2}$ is used. In Example 2, the information bits in the preamble, referred to as the preamble bits, are unchanged when the modulation index sequence $\vec{h}_1$ is selected and are inverted when the modulation index set $\vec{h}_2$ is selected. When modulation index sequence $\vec{h}_3$ is selected, the first 40 bits of the preamble are unchanged and the last 40 bits are inverted.

Receiving Device Implementation

The receiving device 40 detects the control or signaling information sent by the transmitting device 20 by detecting the modulation index $h_n$ (in case of single-h modulation being used at the transmitting device 20) or the modulation index sequence $\vec{h}_n$ (in case of multi-h modulation being used at the receiving device 40). The modulation index $h_n$ or the modulation index sequence $\vec{h}_n$ may be detected by using a known sequence of bits, such as the sync word or preamble.

Example 3

This example is continuation of Example 1 above. Assume that there are two information bit rates, a low information bit rate (e.g., 125 kbps) and a high information bit rate (e.g., 500 kbps). When the modulation index $$h = \frac{1}{2}$$

is used, conventional GFSK is obtained. This modulation produces a phase change of $\pi/2$ when the input bit to the modulator has a value of 1, and a phase change of $-\pi/2$ when the input bit to the modulator has value of 0.

Figure 11B:
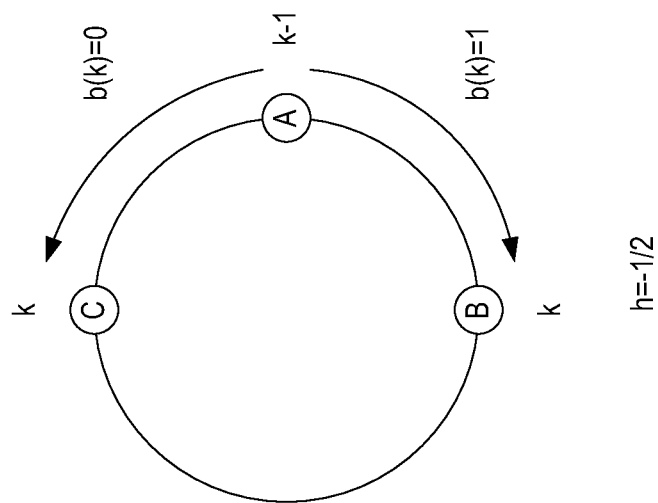
FIGS. 11A and 11B illustrate GFSK modulation.
Figure 11A:
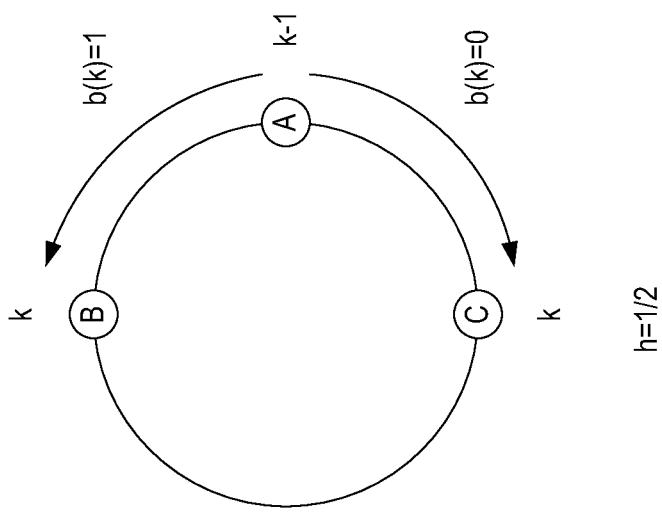

Conventional GFSK modulation with the modulation index $h=\frac{1}{2}$ is shown in FIG. 11A. As shown in FIG. 11A, the phase of the modulated symbol at symbol period k−1 is represented by point A in the I-Q diagram. When the input bit to the modulator in the next symbol period has value 1, a phase change of $\pi/2$ brings the modulated symbol to point B. However, if the bit input to the modulator in the next symbol period has value 0, a phase change of $-\pi/2$ brings the modulated symbol to point C. In either case, the modulated symbol in a given symbol period k is determined by the modulated symbol in symbol period k−1 and the bit input to the modulator in symbol period k.

GFSK modulation with a modulation index $$h = -\frac{1}{2}$$

is similar to modulation with a modulation index $h=\frac{1}{2}$, except that the opposite phase change is generated. In this case the modulator 80 gives a phase change of $-\pi/2$ when the input bit to the modulator has value of 1, and a phase change of $\pi/2$ when the input bit to the modulator 80 has value of 0.

FIG. 11B illustrates GFSK modulation using a modulation index $h=-\frac{1}{2}$. As shown in FIG. 11B, the phase of the modulated symbol at symbol period k−1 is represented by point A in the I-Q diagram. When the input bit to the modulator 80 in the next symbol period has value 1, a phase change of $-\pi/2$ brings the modulated symbol to point B. However, if the input bit to the modulator 80 in the next symbol period has a value of 0, a phase change of $\pi/2$ brings the modulated symbol to point C. In either case, the modulated symbol in a given symbol period k is determined by the modulated symbol in symbol period k−1 and the bit input to the modulator in symbol period k.

Let $b_k$ be the k-th bit of the sync word, $b_k=0$, or 1. If the modulation index is h, and takes on one of the two values $\{\frac{1}{2}, -\frac{1}{2}\}$, the GFSK symbols are $$s(k,h) = e^{j\pi h k} \Pi_{l=0}^{k}(2b_l - 1). \qquad \text{Eq. (6)}$$

Thus, using the GFSK property and knowing the binary values of the bits in the sync word, the receiving device 40 can infer the modulation symbol values s(k, h) corresponding to the sync word. The knowledge of s(k, h) can be used by the receiving device 40 to perform coherent combining or correlation for achieving time synchronization and detection of the modulation index.

Figure 12:
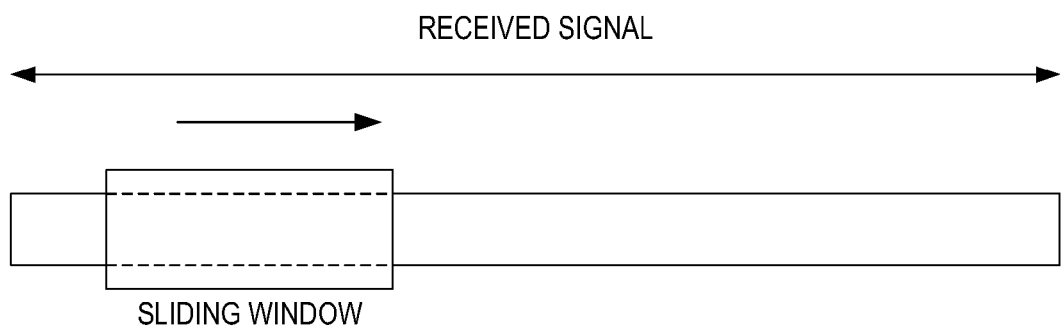
FIG. 12 illustrates a sliding window used for joint time synchronization and modulation index detection.

The received signal can be represented by $$r(k) = s(k-k_0, h)e^{j2\pi(k-k_0)f_o T_s + \theta} + n(k-k_0), \qquad \text{Eq. (7)}$$

where $f_o$ represents the initial frequency error, $T_s$ is the symbol duration, $\theta$ is a random initial phase, and n(k) is contributed by additive white Gaussian noise (AWGN) or interference. The value $k_0$ represents the unknown timing difference between the received and transmitted signals. The objective of joint time synchronization and modulation index detection is to jointly identify the values of $k_0$ and h. As illustrated in FIG. 12, sliding window correlation may be used to identify an N-symbol slice of the received signal that best matches with the sync word signal, where N is the length of the sync word. Assume that c(m, h) is the time synchronization metric for the m-th sync point hypothesis and modulation index hypothesis h. It is given by the following expression.

$$c(m,h) = |\Sigma_{k=0}^{N-1} r(k+m)s^*(k,h)| \qquad \text{Eq. (8)}$$

or $$c(m,h) = \Sigma_{k=0}^{N-1} r(k+m)s^*(k,h) \qquad \text{Eq. (9)}$$

or $$c(m,h) = Re\{\Sigma_{k=0}^{N-1} r(k+m)s^*(k,h)\}. \qquad \text{Eq. (10)}$$

The values of m, h that maximize the metric c(m, h) in Equations 8-10 give the detected time synchronization and modulation index. Note that both m, h in Equations 8-10 take only a finite number of discrete values.

Figure 13:
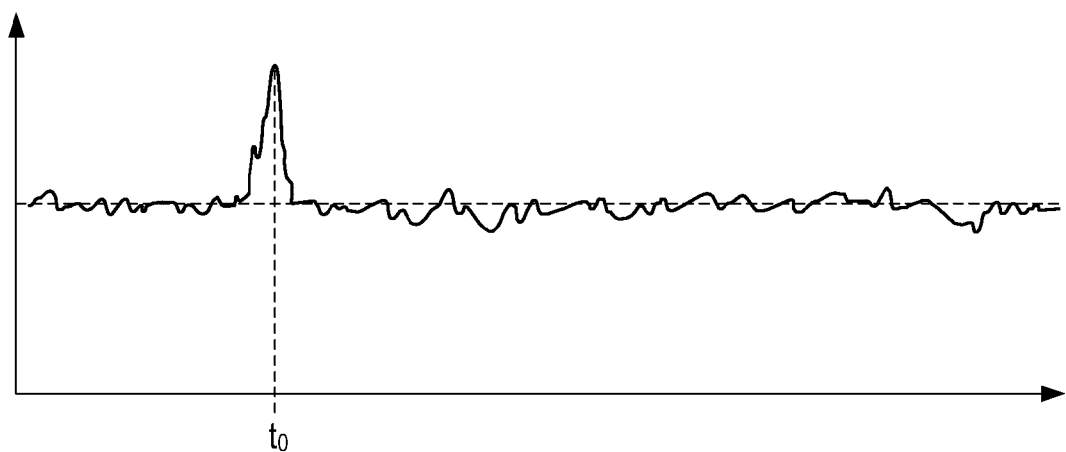
FIG. 13 illustrates a correlation signal generated by correlating a received modulated signal with a known correlation sequence.

FIG. 13 shows an exemplary graph of the correlation metric with respect to time. As seen in FIG. 13, the graph includes a peak indicating the time reference t for synchronization. As described in more detail below, the detected peak in the correlation signal may also be used to determine the modulation index applied to the received signal.

Figure 14:
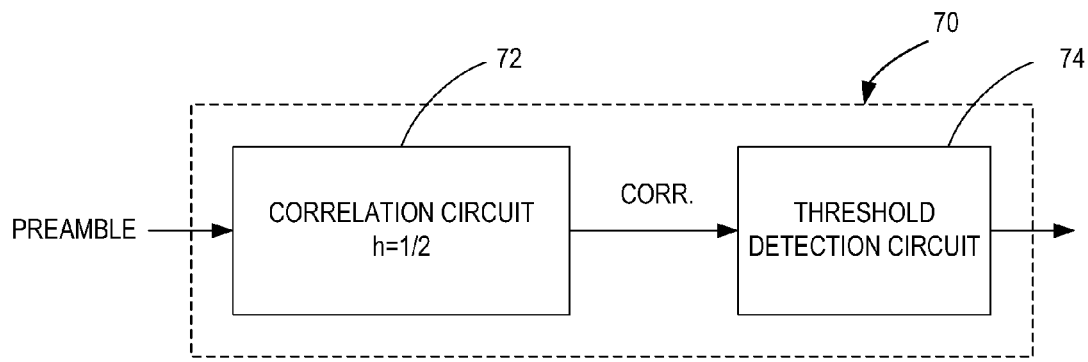
FIG. 14 illustrates a detection circuit for joint time synchronization and modulation index detection.

FIG. 14 illustrates a detection circuit 70 for performing joint time synchronization and modulation detection according to one embodiment. The detection circuit 70 may comprise one or more processors, hardware, firmware, or a combination thereof. The detection circuit 70 comprises a correlation circuit 72 and a threshold detection circuit 74. In this example, it is assumed that the control signal is superimposed on the preamble of a data burst as shown in FIGS. 3 and 4. It is further assumed that single-h CPM is used at the transmitting device 20. The preamble contains 80 bits so an 80-bit sliding window is used.

The detection circuit 70 takes advantage of the fact that the modulation index can take only two values, $+\frac{1}{2}$ and $-\frac{1}{2}$. It is assumed that the known preamble is modulated using GFSK modulation with a modulation index $h=\frac{1}{2}$. The correlation circuit 72 is configured to compare the received signal with a sequence of modulated symbols computed based on the assumption that the preamble is modulated using GFSK modulation with a modulation index $h=\frac{1}{2}$. The modulated symbol sequence used by the correlation circuit 72 is referred to herein as the correlation sequence. As the window slides over the received signal, a correlation signal is generated according to, for example, Equation 10. The correlation signal is input to the threshold detection circuit 74. The threshold detection circuit 74 detects a peak in the correlation signal, which provides the time reference for the received signal. The peak is compared to a threshold, which in this case is 0. If the peak in the correlation signal is positive (above the threshold), the modulation index h=½ is deemed to be detected. If the peak in the correlation signal is negative (below the threshold), the modulation index h=−½ is deemed to be detected.

Those skilled in the art will readily appreciate that the correlation sequence could also be generated based on the assumption that the modulation index h=−½. In this case, a positive peak in the correlation signal is associated would indicate that the modulation index h=−½ and a negative correlation peak would indicate that the modulation index h=½.

Figure 15:
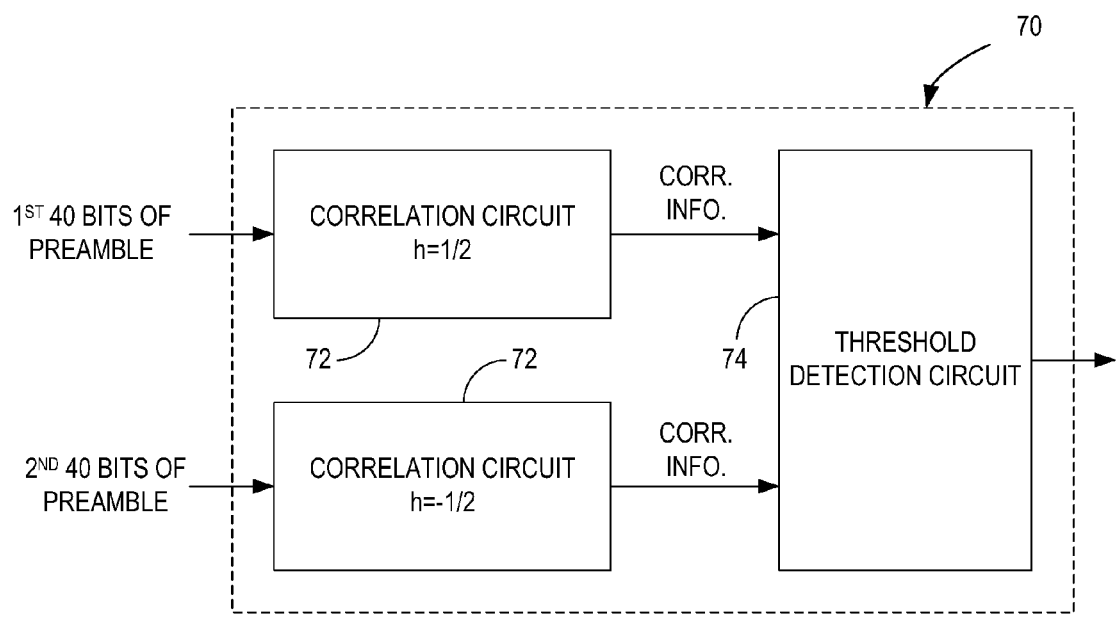
FIG. 15 illustrate another exemplary detection circuit for joint time synchronization and modulation index detection.

FIG. 15 illustrates a detection circuit 70 for performing joint time synchronization and modulation detection according to another embodiment. The detection circuit 70 comprises two correlation circuits 72 and a threshold detection circuit 74. In this example, it is assumed that the control signal is superimposed on the preamble of a data burst as shown in FIGS. 3 and 4. It is further assumed that multi-h CPM as described in Example 2 is used. To briefly reiterate, modulation index shift signaling is used to indicate one of three possible information bit rates. The modulation index sequence given in Equation 3 is used to indicate a low information bit rate (e.g., 125 kbps). The modulation index sequence given in Equation 4 is used to indicate a medium information bit rate (e.g., 250 kbps). The modulation index sequence given in Equation 5 is used to indicate a low information bit rate (e.g., 500 kbps).

In this example, a first one of the correlation circuits 72 is configured to search for the first 40 bits of the preamble and uses a correlation sequence generated based on the assumption that the modulation index h=½ is used for the first 40 bits. A second one of the correlation circuits 72 is configured to search for the last 40 bits of the preamble and uses a correlation sequence generated based on the assumption that the modulation index h=−½ is used for the last 40 bits. Thus, each correlation circuit 72 uses a sliding window 40 bits in length and offset by 40 bits.

In operation, the first correlation circuit 72 compares the received signal with a sequence of modulated symbols computed based on the assumption that the first 40 bits of the preamble is modulated using GFSK modulation with a modulation index h=½. The second correlation circuit 72 compares the received signal with a sequence of modulated symbols computed based on the assumption that the last 40 bits of the preamble is modulated using GFSK modulation with a modulation index h=−½. As the windows slide over the received signal, two correlation signals are generated according to, for example, Equation 10. The correlation signals are input to the threshold detection circuit 74. The threshold detection circuit 74 detects peaks in the correlation signals, which provide the time reference for the received signal. The peaks are compared to a threshold, which in this case is 0, to determine the modulation index for the first and last 40 bits of the preamble. If the peak in the correlation signal from the first correlation circuit is positive (above the threshold), the modulation index h=½ is deemed to be detected. If the peak in the correlation signal is negative (below the threshold), the modulation index h=−½ is deemed to be detected. The opposite assumptions are made for the correlation signal from the second correlation circuit 72. If the peak in the correlation signal from the second correlation circuit is positive (above the threshold), the modulation index h=−½ is deemed to be detected. If the peak in the correlation signal is negative (below the threshold), the modulation index h=½ is deemed to be detected.

The receiving device 40 can determine the control message based on the detected modulation indices. Table 1 below shows the mapping of the modulation indices to control messages.

TABLE 1

Mapping of Modulation Indices to Control messages

| First 40 Bits | Second 40 Bits | Info. Bit Rate |
| --- | --- | --- |
| h = ½ | h = ½ | 125 kbps |
| h = −½ | h = −½ | 250 kbps |
| h = ½ | h = −½ | 500 kbps |

The example above illustrates sliding window correlation for joint time synchronization and modulation index detection. Those skilled in the art will recognize that other detection algorithms may also be used. It should be noted that any time synchronization algorithm relying on a known synchronization word is easily modified to perform joint time synchronization and modulation index detection by using the Equation 6 and allowing two hypotheses for the modulation index h.

Figure 16:
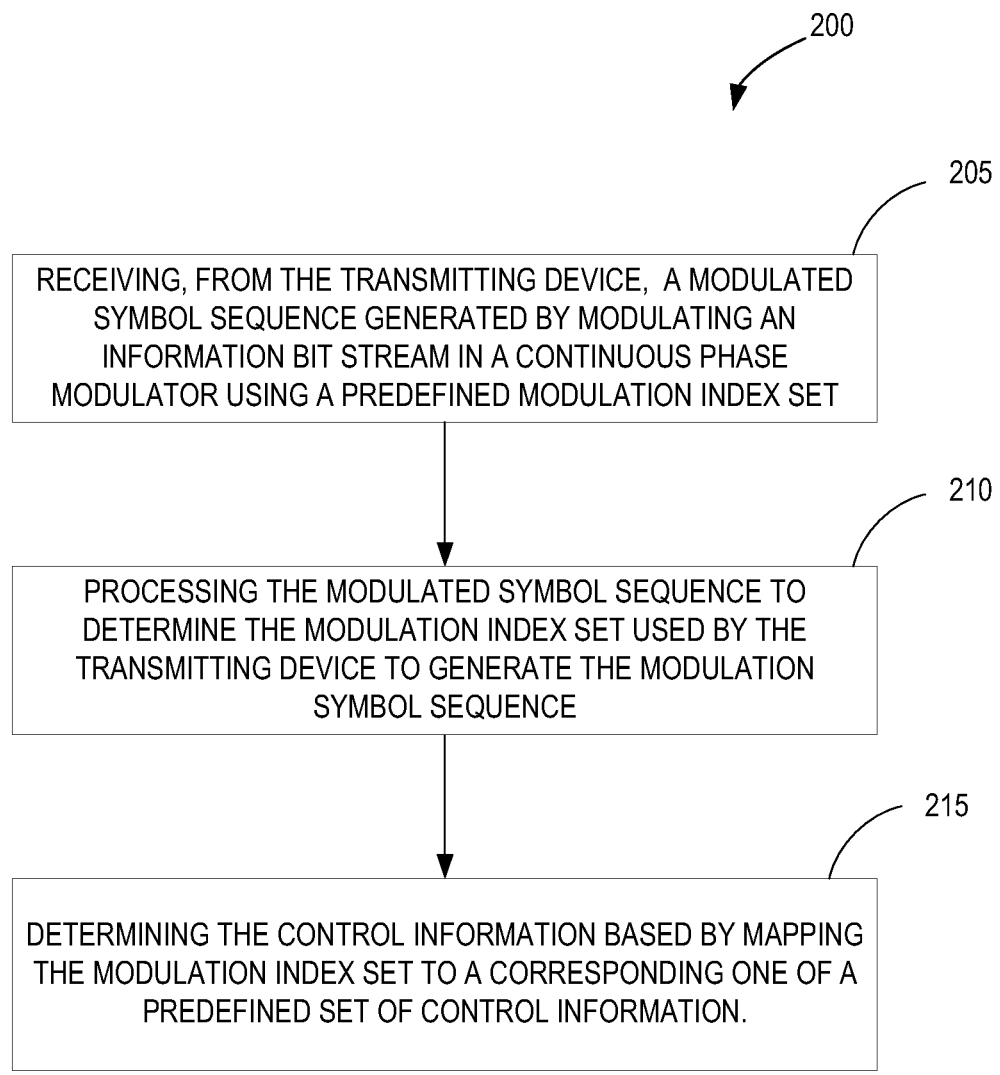
FIG. 16 illustrates a method implemented by a receiving device of receiving control information from a transmitting device.

FIG. 16 illustrates an exemplary method 200 implemented by a receiving device 40 for receiving a control signal from a transmitting device 20. The method begins when the receiving device 40 receives a data burst from the transmitting device 20. The receiving device 40 receives, from the transmitting device 20, a modulated signal generated by modulating an information bit stream in a continuous phase modulator using a selected modulation index set that indicates the control information (block 205). As previously described, the modulation index set may comprise a single modulation index in the case of single-h CPM or a modulation sequence in the case of multi-h CPM. The receiving device 40 processes the modulated signal to detect the modulation index set used by the transmitting device 20 to generate the modulated signal (block 210). The receiving device 40 determines the control information by mapping the modulation index set to a corresponding one of a predefined set of control information. As an example, the control information may comprise a selected one of two or more possible information bit rates or other data rate information. The set of possible information bit rates comprises the set of control information. In some embodiments, the receiving device 40 may optionally demodulate the modulated signal to coded data bits that are carried in the payload of the data burst (block 220) and decode the coded data bits based on the control information to obtain user data bits (block 225).

Figure 17:
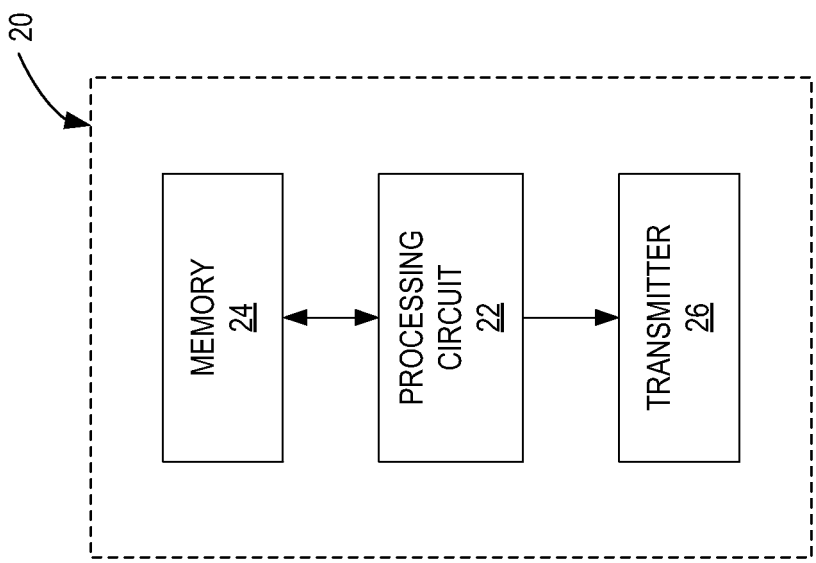
FIG. 17 illustrates an exemplary transmitting device that is configured for modulation index shift signaling.

FIG. 17 illustrates the main functional components of a transmitting device 20 that is configured to perform modulation index shift signaling as herein described. The transmitting device 20 comprises a processing circuit 22, memory 24, and a transmitter 26. The processing circuit 22 may comprise one or more microprocessors, hardware circuits, firmware, or a combination thereof. The processing circuit 22 is configured to perform the method illustrated in FIG. 8. The processing circuit 22 generates a modulated signal that signals control information to a receiving device 40. The processing circuit generates the modulated signal by mapping control information (e.g., a control message) to a selected modulation index set and modulating the an information bit stream intended for the receiving device according to the selected modulation index set. Memory 24 comprises one or more memory devices that store program code and data used by the processing circuit 22. Memory may, for example comprise non-volatile memory for storing program code and data needed for operation and volatile memory for storing temporary data. The transmitter 26 is configured to transmit the modulated signal generated by the processing circuit 22. The transmitter 26 may, for example, comprise a BLE or BLE Long Range transmitter that implements the BLUETOOTH standard. The transmitter 26 may be part of a transceiver capable receiving as well as transmitting information.

Figure 18:
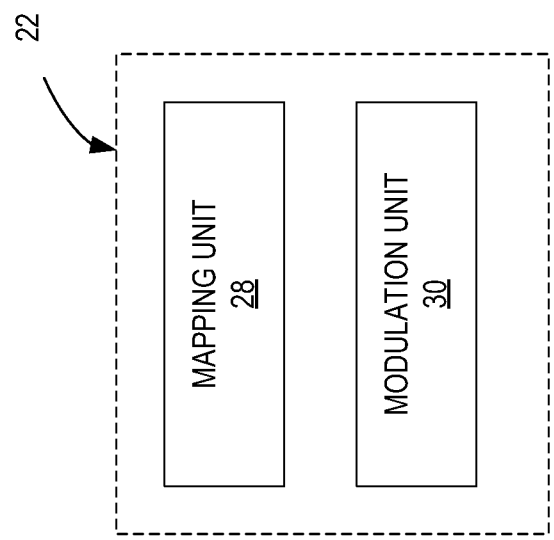
FIG. 18 illustrates an exemplary processing circuit for a transmitting device that is configured for modulation index shift signaling.

FIG. 18 illustrates the main functional components in the processing circuit 22. The processing circuit 22 comprises a mapping unit 28 configured to map control information to a selected modulation index set and a modulation unit 30 configured to modulate an information bit stream intended for the receiving device 40 according to the selected modulation index set. The mapping unit 28 and modulation unit 30 may be implemented by a microprocessor, hardware circuit, application specific integrated circuit (ASIC), or other circuitry.

Figure 19:
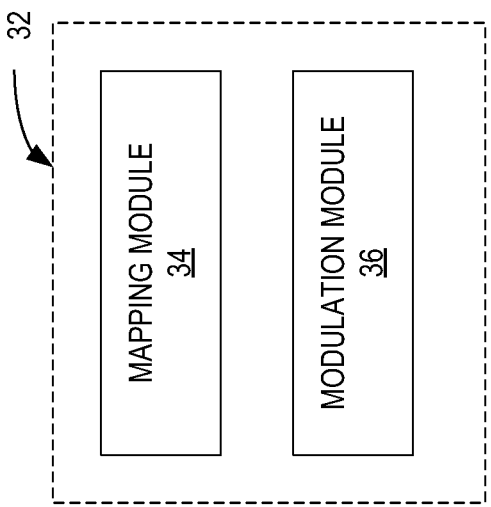
FIG. 19 illustrates a computer program product stored in memory of a transmitting device for performing modulation index shift signaling.

FIG. 19 illustrates a computer program product 32 that is stored in the memory 24 of the transmitting device 20. The main functional components of the computer program product comprise a mapping module 34 and modulation module 36. The mapping module 34 comprises program code used by the processing circuit 22 for mapping control information to a selected modulation index set. The modulation module 36 comprises program code used by the processing circuit 22 for modulating an information bit stream intended for the receiving device 40 according to the selected modulation index set.

Figure 20:
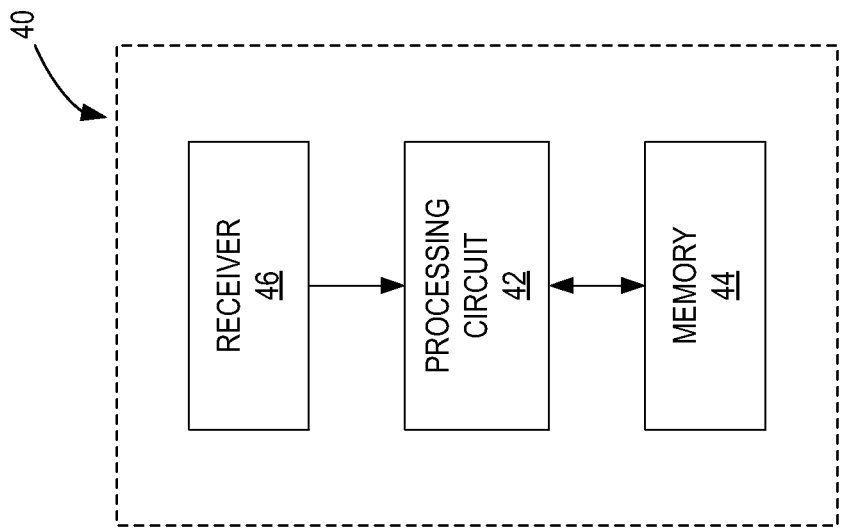
FIG. 20 illustrates an exemplary receiving device that is configured for modulation index shift signaling.

FIG. 20 illustrates the main functional components of a receiving device 40 that is configured to perform modulation index shift signaling as herein described. The receiving device 40 comprises a processing circuit 42, memory 44, and a receiver 46. The processing circuit 42 may comprise one or more microprocessors, hardware circuits, firmware, or a combination thereof. The processing circuit 42 is configured to perform the method illustrated in FIG. 16. The processing circuit 22 receives a modulated signal having a control signal superimposed on an information bit stream intended for the receiving device 40. The processing circuit processes the received modulated signal to determine the modulation index set used by the transmitting device to generate the modulated signal. Based on the modulation index set detected, the processing circuit determines the control information. Memory 44 comprises one or more memory devices that store program code and data used by the processing circuit 44. Memory 44 may, for example comprise non-volatile memory for storing program code and data needed for operation and volatile memory for storing temporary data. The receiver 46 is configured to transmit the modulated signal generated by the processing circuit 42. The receiver 46 may, for example, comprise a BLE or BLE Long Range transmitter that implements the BLUETOOTH standard. The receiver 46 may be part of a transceiver capable transmitting as well as receiving information.

Figure 21:
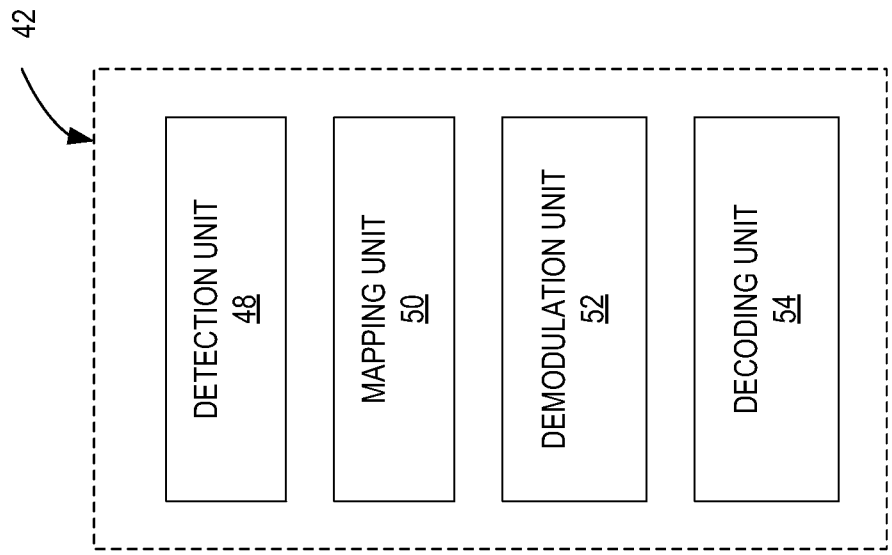
FIG. 21 illustrates a processing circuit for a receiving device that is configured for modulation index shift signaling.

FIG. 21 illustrates the main functional components in the processing circuit 42 in the receiving device 40. The processing circuit 42 comprises a detection unit 48 and mapping unit 50. The detection unit 48 is configured to detect the modulation index used by a transmitting device 20 to modulate an information bit stream intended for the receiving device. The mapping unit 50 is configured to determine control information based on the detected modulation index. The processing circuit 44 may further comprise a demodulation unit 52 and decoding unit 54. The demodulation unit 52 is configured to demodulate the received signal. The decoding unit 54 is configured to decode the demodulated signal.

Figure 22:
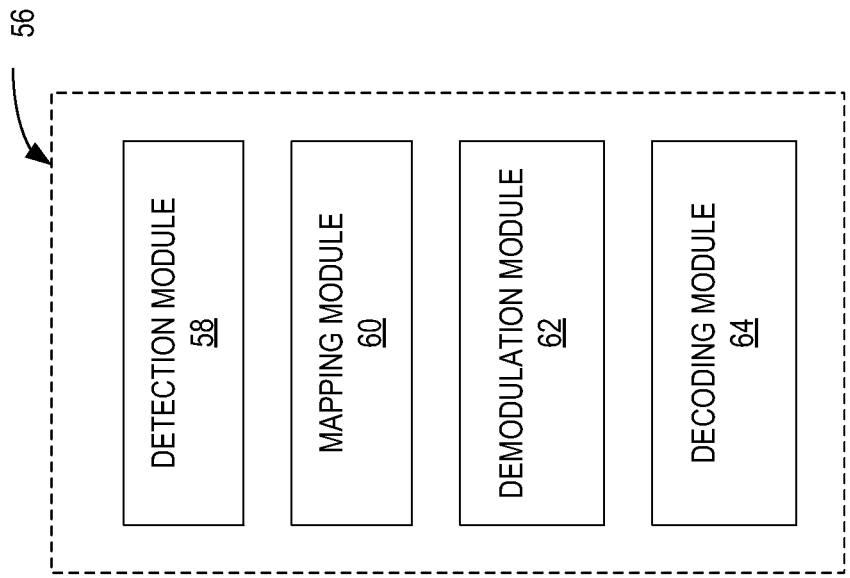
FIG. 22 illustrates a computer program product stored in memory of a receiving device for performing modulation index shift signaling.

FIG. 22 illustrates a computer program product 56 that is stored in the memory 44 of the receiving device 40. The main functional components of the computer program product 56 comprise a detection module 58 and demodulation module 60. The detection module 58 comprise program code for detecting the modulation index used by a transmitting device 20 to modulate an information bit stream intended for the receiving device 40. The mapping module 60 comprises program code used by the processing circuit 42 to determine control information based on the detected modulation index. The computer program product 56 may further comprise a demodulation module 62 and decoding module 64. The demodulation module 62 comprises program code used by the processing circuit 42 to demodulate the received signal. The decoding unit 64 comprises program code used by the processing circuit 42 to decode the demodulated signal.

What is claimed is:

1. A method of sending control information from a transmitting device to a receiving device, the method comprising:
generating a modulated signal that signals the control information to the receiving device by mapping the control information to a selected modulation index set and modulating an information bit stream for the receiving device with a continuous phase modulator using the selected modulation index set; and
transmitting the modulated signal to the receiving device.

2. The method of claim 1 wherein the modulation index set comprises a single index value applied to selected information bits in said information bit stream.

3. The method of claim 1 wherein the modulation index set comprises a sequence of index values applied to respective ones of selected information bits in said information bit stream.

4. The method of claim 1 wherein modulating an information bit stream for the receiving device comprises modulating an known bit sequence in the information bit stream that is known to the receiving device using the selected modulation index set.

5. The method of claim 4 wherein modulating the known bit sequence comprises modulating a predefined synchronization sequence in the information bit stream using the selected modulation index set.

6. The method of claim 1 wherein each modulation index in the modulation index set is set to one of a first value or a second value.

7. The method of claim 6 wherein modulating an information bit stream for the receiving device comprises:
inverting the sign of each selected information bit in the information bit stream when the value of a corresponding modulation index in the modulation index set is the second value to generate a modified information bit stream; and
modulating the modified information bit stream in the continuous phase modulator using a fixed modulation index corresponding to the first value.

8. The method of claim 6 wherein modulating an information bit stream with a continuous phase modulator using the selected modulation index set comprises:
modulating the information bit stream in the continuous phase modulator using a fixed modulation index corresponding to the first value to generate an initial signal;

conjugating selected ones of the modulation symbols in the initial signal when a corresponding modulation index in the modulation index set is the second value to generate the modulated signal.

9. The method of claim 1 wherein the information bit stream includes user data bits and wherein the control information comprises data rate information for the user data bits in the information bit stream.

10. A transmitting device configured to send control information to a receiving device comprising:
a processing circuit configured to generate a modulated signal that signals control information to a receiving device by mapping the control information for the receiving device to a selected modulation index set and modulating an information bit stream with a continuous phase modulator using the selected modulation index set; and
a transmitter configured to transmit the modulated information bit steam to a receiving device.

11. The transmitting device of claim 10 wherein the modulation index set comprises a single index value applied to selected information bits in said information bit stream.

12. The transmitting device of claim 10 wherein the modulation index set comprises a sequence of index values applied to respective ones of selected information bits in said information bit stream.

13. The transmitting device of claim 10 wherein the processing circuit is configured to modulate a known bit sequence in the information bit stream that is known to the receiving device using the selected modulation index set.

14. The transmitting device of claim 13 wherein the wherein the continuous phase modulator is configured to modulate a predefined synchronization sequence in the information bit stream using the selected modulation index set.

15. The transmitting device of claim 10 wherein each modulation index in the modulation index set used by the processing circuit is set to one of a first value or a second value.

16. The transmitting device of claim 15 wherein the processing circuit is configured to modulate the information bit stream by:
inverting the sign of each selected information bit in the information bit stream when the value of a corresponding modulation index in the modulation index set is the second value to generate a modified information bit stream; and
modulating the modified information bit stream using a fixed modulation index corresponding to the first value.

17. The transmitting device of claim 15 wherein the processing circuit is configured to modulate the information bit stream by:
modulating the information bit stream with the continuous phase modulator using a fixed modulation index corresponding to the first value to generate an initial signal; and
conjugating selected ones of the modulation symbols in the initial signal when a corresponding modulation index in the modulation index set is the second value to generate the modulated signal.

18. The transmitting device of claim 10 wherein the information bit stream includes user data bits and wherein the control information comprises data rate information for the user data bits in the information bit stream.

19. A method of receiving control information from a transmitting device, the method comprising:
receiving, from the transmitting device, a modulated signal generated by modulating an information bit stream in a continuous phase modulator using a predefined modulation index set;
processing the modulated signal to detect the modulation index set used by the transmitting device to generate the modulated signal; and
determining the control information by mapping the modulation index set to a corresponding one of a predefined set of control information.

20. The method of claim 19 wherein the modulation index set comprises a single index value applied to selected information bits in said information bit stream.

21. The method of claim 19 wherein the modulation index set comprises a sequence of index values applied to respective ones of selected information bits in said information bit stream.

22. The method of claim 19 wherein processing the modulated signal to detect the modulation index set comprises processing a portion of the modulated signal containing a known bit sequence to detect the modulation index set.

23. The method of claim 22 wherein processing a portion of the modulated signal containing a known bit sequence to detect the modulation index set comprises processing a portion of the modulated signal containing a known bit sequence to jointly detect the modulation index set and time synchronization.

24. The method of claim 19 wherein processing the modulated signal to detect the modulation index set comprises correlating the modulated signal with one or more known modulation symbol sequences.

25. The method of claim 24 wherein correlating the modulated signal with one or more known modulation sequences comprises correlating a first portion of the modulated signal with a first predetermined index sequence and correlating a second portion of the modulated signal with a second predetermined index sequence.

26. The method of claim 19 wherein the information bit stream includes user data bits and further comprising:
demodulating the modulated signal to obtain coded data bits; and
decoding the coded data bits based on the control information to obtain the user data bits.

27. A receiving device comprising:
a receiver configured to receive, from a transmitting device, a modulated signal sequence generated by modulating an information bit stream in a continuous phase modulator using a predefined modulation index set;
a processing circuit configured to detect the modulation index set used by the transmitting device to generate the modulated signal, and to determine the control information by mapping the modulation index set to a corresponding one of a predefined set of control information.

28. The receiving device of claim 27 wherein the modulation index set comprises a single index value applied to selected information bits in said information bit stream.

29. The receiving device of claim 27 wherein the modulation index set comprises a sequence of index values applied to respective ones of selected information bits in said information bit stream.

30. The receiving device of claim 27 wherein the processing circuit is configured to detect the modulation index set by processing a portion of the modulated signal containing a known bit sequence.

31. The receiving device of claim 30 wherein the processing circuit is further configured to process the known bit sequence to jointly detect the modulation index set and the time synchronization.

32. The receiving device of claim 27 wherein the processing circuit comprises a detection circuit is configured to correlate the modulated signal with one or more known modulation symbol sequences.

33. The receiving device of claim 27 wherein the processing circuit is configured to correlate a first portion of the modulated signal with a first modulation symbol sequence and a second portion of the modulated signal with a second modulation symbol sequence.

34. The receiving device of claim 27 wherein the information bit stream includes user data bits and wherein the processing circuit further comprises:
   a demodulator for demodulating the modulated signal to obtain coded data bits; and
   a decoder for decoding the coded data bits based on the control information to obtain the user data bits.

35. A computer program product stored in a non-transitory computer readable medium for controlling the sending of control information from a transmitting device to a receiving device, the computer program product comprising software instructions which, when run on at least one processor of the transmitting device, causes the transmitting device to:

generate a modulated signal that signals the control information to the receiving device by mapping the control information to a selected modulation index set and modulating an information bit stream for the receiving device with a continuous phase modulator using the selected modulation index set; and transmit the modulated signal to the receiving device.

36. A computer program product stored in a non-transitory computer readable medium for controlling the receiving of control information from a transmitting device, the computer program product comprising software instructions which, when run on at least one processor of a receiving device, causes the receiving device to:

receive, from the transmitting device, a modulated signal generated by modulating an information bit stream in a continuous phase modulator using a predefined modulation index set;

process the modulated signal to detect the modulation index set used by the transmitting device to generate the modulated signal; and determine the control information by mapping the modulation index set to a corresponding one of a predefined set of control information.

* * * * *